Oct. 4, 1960  W. L. BROWN  2,954,589
METHOD OF MOLDING EXPANDED RESINS
Filed March 19, 1956  2 Sheets-Sheet 1
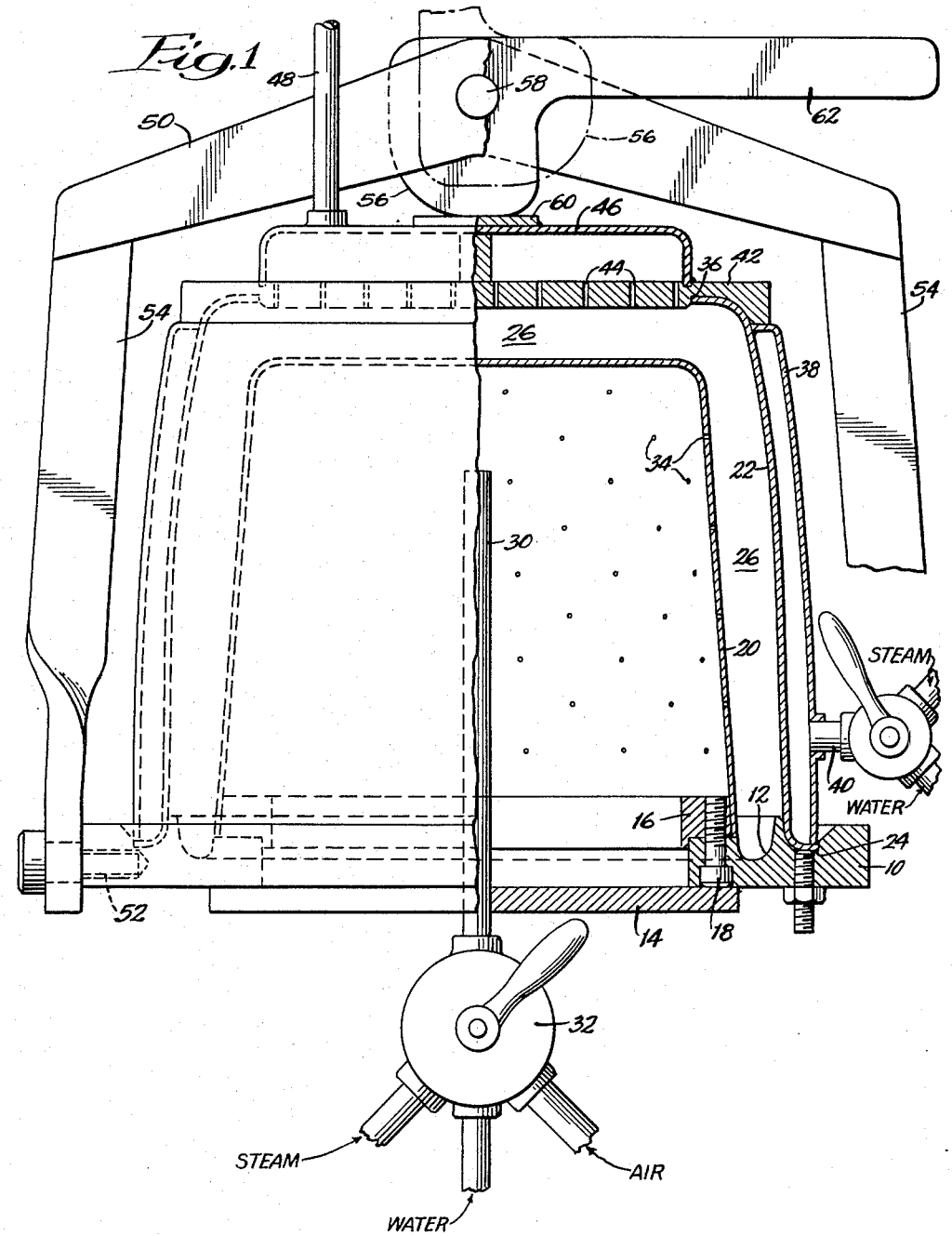

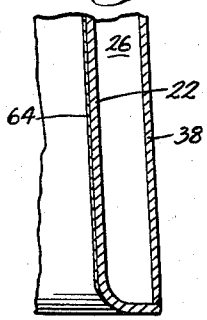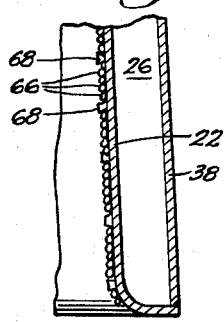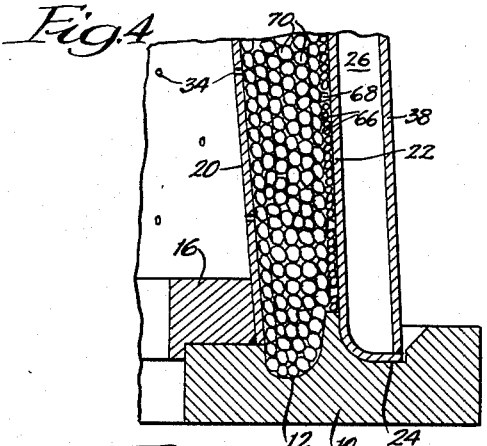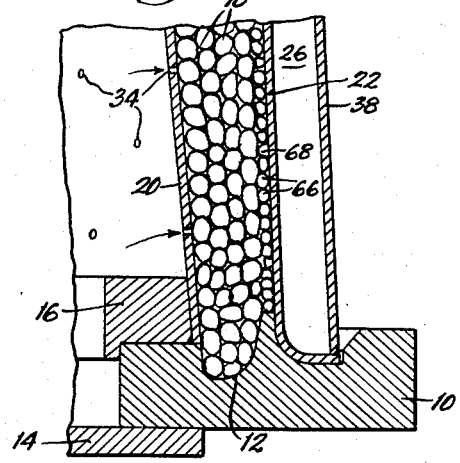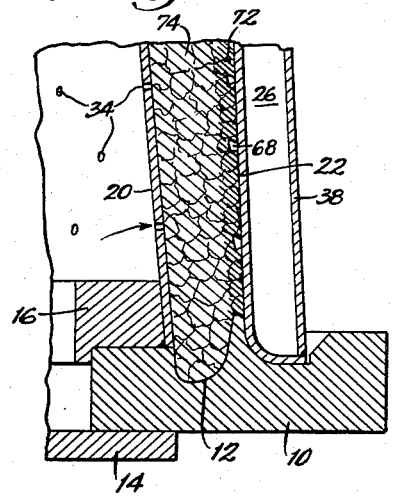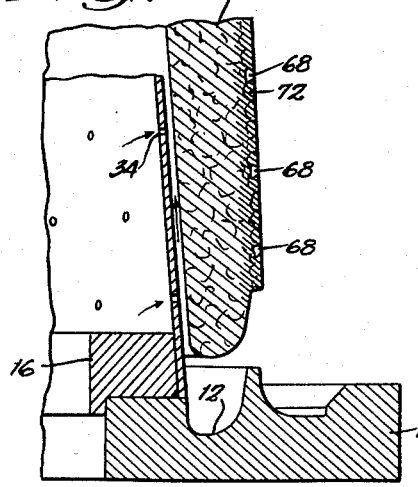

United States Patent Office 2,954,589
Patented Oct. 4, 1960

2,954,589

METHOD OF MOLDING EXPANDED RESINS

Winthrop L. Brown, Evansville, Ind., assignor to Kent Plastics Corporation, Evansville, Ind., a corporation of Indiana Filed Mar. 19, 1956, Ser. No. 572,451

3 Claims. (Cl. 18—59)

This invention relates to an improved method for preparing molded articles from cellular thermoplastic resins. Excellent lightweight thermal-insulating cellular articles may be produced from compressed polystyrene beads having a blowing agent incorporated therein. Beads of this kind are known in the art and are commercially available. Upon application of heat, the compressed beads will expand up to approximately thirty times their original volume to produce a cellular article having completely closed uniform cells. In molding an article, the polystyrene beads are placed in the mold cavity and subjected to heat above the temperature at which the beads soften sufficiently to expand under the pressure exerted by the blowing agent. The beads expand until the mold cavity is completely filled. Articles of varying density may be produced by molding beads which have been partially pre-expanded to desired density. Articles having a density of less than 2 pounds per cubic foot may be made from polystyrene beads in this manner.

Because of its excellent thermal-insulating properties cellular polystyrene has found extensive use in receptacles for insulating cold articles, such as containers for storing ice cubes or the like. Receptacles of this kind are highly satisfactory from the insulating standpoint but are incapable of withstanding even moderate use without becoming dented or disfigured. The low density polystyrene, which is responsible for the greatly improved insulating qualities, is so soft that it will dent under very slight impact.

The object of the present invention is to provide a practical method for preparing from heat expandable thermoplastic resins cellular molded articles having a dense, dent-resistant exterior skin. The method consists in adhering to the surface of the mold cavity a layer of thermoplastic resinous granules, filling the remaining space in the cavity with heat-expandable resin, such as partially expanded polystyrene beads, and then subjecting the mold to an elevated temperature to expand the heat-expandable resin and fuse the two layers into a unitary structure. The resinous granules form a dense skin on the surface of the article which provides greatly improved impact and dent resistance.

Reference is now made to the accompanying drawings, wherein:

Figure 1 is an elevational view, partly in section, of apparatus suitable for carrying out the process of the invention;

(Figures 2 through 7 show progressive steps in the process.)

Figure 2 is a sectional view through a portion of the outer shell of the mold showing the adhesive used for adhering the thermoplastic resin granules to the mold surface;

Figure 3 is a similar view after the granules of resin, which will form the outer skin, have been deposited on the adhesive;

Figure 4 is a cross-sectional view of a portion of a mold showing both the outer and the inner shells in assembled relation, the space between them being filled with partially expanded polystyrene beads;

Figure 5 is a view similar to Figure 4 just after the initial heat has been applied;

Figure 6 is a view similar to Figure 4 showing the condition of the resinous materials after expansion has been completed; and Figure 7 is a similar view after the outer shell has been removed and during the step of ejecting the molded article from the inner shell.

The molding apparatus consists of a base ring 10 having a circumferential groove 12 which forms the lip of the hollow receptacle to be molded therein. The interior of the ring is closed off by means of a plate 14, and an inner locating ring 16 is secured by means of screws 18 to the ring 10 for locating the inner shell 20 comprising one-half of the mold. The inner shell corresponds exactly to the interior dimensions of the receptacle to be molded. The outer shell 22 is adapted to fit into a circumferential groove 24 cut in the ring 10 concentric with groove 12. The space 26 between the inner shell 20 and the outer shell 22 forms the mold cavity in which the molding material is shaped.

To permit heating and cooling the inner shell, a central pipe 30 extends upwardly through the plate 14 to the interior of the hollow shell 20. The pipe is perforated so that steam, water or air introduced at the lower end through the valve 32 will fill the space within the shell 20. An outlet (not shown) is provided to permit escape of fluids from the shell interior. The steam is used to heat the inner surface of the mold cavity, the water is used to cool it, and the air is used to dislodge the molded article after the molding has been completed. A plurality of uniformly-spaced tiny openings 34 are provided through the wall of the shell 20 to permit penetration of steam into the cavity 26 and venting gases which might be trapped within the cavity as the resin expands upon application of heat.

The outer shell 22 has an opening 36 in the top thereof which permits filling the mold cavity 26 when the mold is in assembled position. The outer shell 22 is jacketed, as indicated at 38, to permit heating or cooling the circumferential wall. Steam and water may be introduced into the jacket through the valved conduit 40 shown at the right-hand side of the drawing and may escape through a second conduit (not shown). An accurately fitted closure 42 is provided to seal the opening 36 after the cavity has been filled. The closure is provided with a plurality of openings 44 which permit venting of the cavity 26, supplementing openings 34 through the inner shell 20. The outer surface of the closure 42 is encased in a jacket 46 which may be heated or cooled by steam or cold water through pipe 48 connecting to the top thereof.

In order to keep the mold closed against the force of the expanding plastic in the mold cavity, a yoke 50 is provided which pivots about the pins 52 extending laterally into the ring 10 through the lower ends of the vertical members 54 of the yoke. Thus, the yoke may be swung from the horizontal to vertical position for securing the shell 22 and the closure 42 in place. A cam-type closure 56, pivotally mounted in the top member of the yoke by means of a pin 58, is employed for applying the necessary pressure to hold the closure 42 in place. In closed position the bottom of the cam 56 engages a contact plate 60 welded to the top of the jacket 46. The cam member 56 is equipped with a manually-operable handle 62. When the handle is swung into vertical position, the cam assumes the position shown in broken lines in Figure 1. This permits the yoke to be swung downwardly and out of the way while the mold is being assembled or disassembled.

In molding cellular thermoplastic articles in accordance with the invention, the first step involves applying an adhesive to the inner surface of the outer shell 22. This surface is the one against which the exterior surface of the finished receptacle will be formed. Consequently, the material molded against this surface becomes the exterior skin of the final article. The adhesive may be sprayed, brushed or otherwise applied to the interior surface in an even coat 64, as best shown in Figure 2. The adhesive should have the following properties:

(1) It must be sufficiently tacky to hold a layer of thermoplastic granules in place even when the mold shell is being moved about and additional material is being vibrated into the shell.

(2) It should serve as a release for the molded part after molding, and under no circumstances should it impair separation of the part from the mold.

(3) It should be of essentially neutral reaction so that it will not attack the metal mold.

(4) It should be inert to the thermoplastic material being molded.

(5) It should be non-toxic so that the final article may be used in contact with foods.

(6) It should be water soluble so that it can be readily rinsed off the mold surfaces or the finished part.

(7) Preferably, it should be sprayable through a standard paint spray gun.

Materials I have found which meet all these requirements are liquid soaps, liquid non-soap detergents and glycerin. All serve satisfactorily as a combination adhesive and mold release agent.

After the adhesive film 64 has been deposited, thermoplastic resinous granules such as unexpanded polystyrene beads 66, methyl methacrylate granules, polyethylene granules, or polystyrene fines containing no blowing agent, are deposited on the surface of the shell 22. This is done preferably by placing an excess quantity of the thermoplastic resinous granules on the adhesive coated surface and rotating the shell so that the granules are picked up by the adhesive. After the entire surface has been coated, the excess granules roll off, leaving only a single layer embedded in the adhesive 64. A layer of thermoplastic granules 66 is shown in place in Figure 3. If desired, these granules may be mixed with decorative beads or particles 68 of glass or metal to produce a decorative effect in the exterior skin of the molded article. The glass or metal particles 68 become embedded in the surface of the final molded product to provide a very pleasing appearance, especially if the particles are of contrasting color to the resin granules 66.

It will be understood that thermoplastic granules may be adhered to any area of the mold cavity surface where improved impact resistance is desired. In the particular article shown only the outside circumference of the receptacle is to have the dense skin. If desired, however, the skin may be provided over the entire exterior surface of the article by adhering granules to the outer surface of the inner shell 20 and the inner surface of the closure 42, as well as to the inner surface of the outer shell 22. The extent of the area so treated can be conveniently controlled applying adhesive 64 only on the surfaces of the mold cavity which are to have the desired dense skin.

The outer shell 22, with the adhered layer of granules 66 and decorative particles 68, is then placed in position over the inner shell 20 with its lower edge in groove 24 of the base ring 10. A heat expandable thermoplastic resin, such as partially expanded polystyrene beads 70 is charged into the mold cavity through opening 36 to fill up the remaining space adjacent the layer of granules 66, as shown in Figure 4. In making the receptacle illustrated, the pre-expanded beads preferably have a density of about 4–6 pounds per cubic foot. The degree of pre-expansion may be varied to provide a lighter or denser part, as desired. The pre-expansion may be carried out by heating a monolayer of the beads at approximately 200° F. for the time required to expand them to desired density.

The closure 42 is then placed over the opening 36 and the yoke 50 is swung into vertical position over the closure. The handle 62 is moved downwardly so that the bottom of the cam 56 bears against the surface 60 to hold the closure 42 securely in place. The mold is then heated by introducing dry steam into the jackets 38 and 46 surrounding the outer shell 22, and into the interior of the inner shell 20. Any other suitable source of heat may be provided but with a jacketed mold of this type steam or other hot fluid is preferred. The pressure of the steam introduced into the outer shell may range from 20–60 pounds per square inch gauge, depending upon the softening point of the surface granules being used. Preferably, the steam is introduced into the interior of the inner shell 20 five seconds or so after the steam is introduced into the outer shell. This permits the granules 66 to flow or weld together, and begin expansion, if they are heat expandable, before the pre-expanded beads 70 further expand to restrict such flow. After about 20 seconds, the beads 70 have expanded sufficiently to fill the entire interior of the cavity. The temperature employed for the inner shell is about 259° F. which is equivalent to 20 pounds per square inch gauge steam, and may range from 15–35 pounds per square inch gauge.

When the steam is turned on to heat the outer shell 22, the granules on the surface begin to soften and, if they contain a blowing agent, to expand to fill in the spaces between them and around the decorative particles 68. An exact impression of the inner surface of the shell 22 is reproduced in the final article. In this case the surface is perfectly smooth. Immediately after softening and/or expansion of the layer of granules 66 has begun, the partially expanded beads 70 expand to completely fill in all of the spaces in the cavity. In Figure 5 the initial heat has been applied to the outer shell so that some flow and expansion of the granules 66 (shown here as heat-expandable beads), in contact with the surface 22, has begun to take place. In Figure 6 the finally expanded product is illustrated. It will be noted that the pre-expanded beads 70 have grown to the point where all of the air lodged between them has been expelled (vented through the openings 34 and 44). In the particular form of the invention shown, it is not necessary to have a perfectly smooth surface on the bottom of the receptacle and, consequently, vent holes 44 may be provided in that surface. However, if the bottom is to have a smooth surface without projections, the vent holes may be placed in the top of the inner shell 20. The openings 34 also permit the steam to penetrate the mold cavity at the beginning of the heating cycle to cause immediate expansion of the pre-expanded beads. As soon as the beads begin to expand, of course, the steam as well as the air in the cavity will be expelled through the vent holes.

The pre-expanded beads 70 which comprise about 85–90% of the cross-sectional thickness of the receptacle wall expand very rapidly, and the force of such expansion prevents the granules 66 on the surface from enlarging any more than about two or three times their normal size. The force also results in flattening the granules 66 against the mold surface. The result is a relatively dense, hard, smooth skin 72 which provides good resistance to impact and abrasion. The skin is fused with the expanded core 74 to produce a unitary structure. Where the beads 66 contain no blowing agent, they merely soften under the influence of heat and spread out under the expanding force of beads 70 to form a thin film or external skin which fuses with the beads 70. The decorative particles 68 become embedded in the dense surface skin, as illustrated in Figures 6 and 7.

Immediately after the beads have been expanded, the steam is turned off and cold water is introduced into the interior of the inner shell 20 and into the jackets 38 and 46 so that the mold cavity is cooled simultaneously from both faces. Because the plastic material being molded remains soft at elevated temperatures, it is necessary to cool the mold part to below 100° F. before it is removed from the mold. Otherwise, distortion will take place. With refrigerated water, the cooling cycle will require about 60 seconds. The handle 62 is then moved upwardly, the yoke is turned to horizontal position and the closure 42 is removed. The outer shell 22 is lifted from the part without difficulty due to the glycerin mold release agent, and the part is blown off the inner shell 20 by introducing air through the pipe 30 into the interior of the shell. The pressurized air exerts a force on the mold part through the openings 34. The path of the air is illustrated by the arrows in Figure 7. The air film between the part and the mold permits easy removal. During the time the air is being introduced into the inner shell 20 it is necessary, of course, to close the exhaust so that pressure will build up.

The temperature employed on the inner shell should be limited to about 35 pounds per square inch gauge steam (280° F.). If the temperature exceeds this value, the expanded beads will tend to collapse due to excess softening of the thermoplastic resin, and the closed cell structure will be spoiled. It will be understood that the resin must be softened sufficiently to permit the blowing agent to expand the beads, but not so much as to permit disintegration thereof.

The final product may be lacquered to provide a decorative finish on the exterior, or it may be treated in any other desired manner to provide decoration. For example, the resinous granules 66 which comprise the external surface of the mold part may be prepared with suitable pigment or dye to impart color to the receptacle.

The heat-expandable thermoplastic resin beads may contain a small quantity of an entrapped gas, such as dichlorobutanes, dichlorodifluoromethanes, or similar gases which expand readily upon application of heat. The resin may also take the form of pellets which contain a chemical that decomposes at elevated temperature to release large quantities of gas. A frothed liquid resin, which sets up to a hard cellular mass upon application of heat, may also be used as the cellular core material in articles made in accordance with this invention. The foamed liquid would, of course, have interconnected cells and for some purposes is not as desirable as the materials expanded by blowing agents, which form unicellular porous products.

It will be understood that articles other than receptacles may be molded by the process of the present invention. The details set forth herein are by way of example for purposes of illustrating the invention and are not intended to limit the invention. For example, there are many uses for sheet materials which have a relatively soft low density core and a dense exterior skin. The present method has been found to be very satisfactory for preparing such sheet materials.

What I claim as new and desire to secure by Letters Patent of the United States is:

1. A method for preparing a molded cellular article from polystyrene resin which comprises providing a mold having a cavity of article shape with vertically disposed side walls, applying a combination adhesive and mold release agent taken from the group consisting of liquid soaps, liquid non-soap detergents and glycerin over at least a part of the surface of the mold cavity including said side walls, depositing polystyrene resinous granules on the adhesive to form a layer on said cavity surface, filling said cavity adjacent said layer with heat-expandable, partially expanded polystyrene beads, heating the mold to complete expansion of the beads and simultaneously fuse the resin granules into a relatively dense shell integral with said expanded beads, cooling the mold to below the heat distortion temperature of the molded article, and removing the article from the mold.

2. A method for preparing a molded cellular article from thermoplastic resinous material which comprises providing a mold having a cavity of article shape with vertically disposed side walls, applying glycerin over at least a part of the surface of the mold cavity including said side walls, depositing unexpanded polystyrene beads on the glycerin to form a layer adhered to said cavity surface, filling the mold cavity adjacent said layer with heat-expandable, partially expanded polystyrene beads, heating the mold to expand both the unexpanded and partially expanded beads to an integral, unitary article having a denser surface than interior, cooling the mold to below the heat distortion temperature of the article, and removing the article from the mold.

3. A method for preparing a molded cellular receptacle from heat-expandable polystyrene beads which comprises providing a mold having separate inner and outer shells which nest to provide a receptacle-shaped cavity therebetween when in assembled position, said cavity having vertical side walls applying glycerin over the interior surface of said outer shell including said side wall, depositing said heat-expandable beads on said glycerin to form a layer on said surface, assembling said inner and outer shells, filling the cavity therebetween with partially expanded polystyrene beads, heating the mold to expand both the unexpanded and partially expanded beads to an integral, unitary receptacle having a relatively dense exterior surface, cooling the mold to below the heat distortion temperature of the receptacle and removing the receptacle from the mold.

References Cited in the file of this patent

UNITED STATES PATENTS

| | | |
|---|---|---|
| 1,435,526 | Johnston et al. | Nov. 14, 1922 |
| 1,862,740 | Edison | June 14, 1932 |
| 2,394,327 | Niessen et al. | Feb. 5, 1946 |
| 2,454,910 | Carr | Nov. 30, 1948 |
| 2,604,664 | Jordan | July 29, 1952 |
| 2,744,291 | Stastny et al. | May 8, 1956 |
| 2,787,809 | Stastny | Apr. 9, 1957 |